(12) United States Patent
Lee

(10) Patent No.: US 9,285,236 B2
(45) Date of Patent: Mar. 15, 2016

(54) NAVIGATION METHOD AND APPARATUS FOR MOBILE TERMINAL

(75) Inventor: Hyung Suk Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1030 days.

(21) Appl. No.: 12/927,042

(22) Filed: Nov. 5, 2010

(65) Prior Publication Data

US 2011/0125397 A1 May 26, 2011

(30) Foreign Application Priority Data

Nov. 20, 2009 (KR) ........................ 10-2009-0112660

(51) Int. Cl.
*G01C 21/00* (2006.01)
*G02B 27/01* (2006.01)
*G01C 21/36* (2006.01)
G01C 21/34 (2006.01)
G01C 21/26 (2006.01)

(52) U.S. Cl.
CPC ................................... *G01C 21/365* (2013.01)

(58) Field of Classification Search
CPC ...... G01C 21/365; G01C 23/00; G01C 21/00; G02B 2027/0118; G02B 2027/0112; G02B 27/01; B60R 2300/205
USPC ................................................ 701/400–541
See application file for complete search history.

(56) References Cited

U.S. PATENT DOCUMENTS

| 5,878,395 | A * | 3/1999 | Bennett | 704/275 |
| 2003/0160736 | A1* | 8/2003 | Faso et al. | 345/8 |
| 2006/0244825 | A1* | 11/2006 | Wang et al. | 348/115 |
| 2007/0067415 | A1* | 3/2007 | Kawaguchi | 709/217 |
| 2007/0112444 | A1* | 5/2007 | Alberth et al. | 700/32 |
| 2008/0077882 | A1* | 3/2008 | Kramer et al. | 715/810 |
| 2008/0114545 | A1* | 5/2008 | Takaoka et al. | 701/220 |
| 2008/0249712 | A1* | 10/2008 | Wang | 701/210 |
| 2009/0058761 | A1* | 3/2009 | Chen et al. | 345/7 |
| 2009/0150061 | A1* | 6/2009 | Chen et al. | 701/200 |

(Continued)

FOREIGN PATENT DOCUMENTS

| KR | 1997-0001973 | 3/1997 |
| KR | 2009-230282 | 9/1997 |

(Continued)

OTHER PUBLICATIONS

Korean Office Action dated Dec. 30, 2015 in connection with Korean Application 10-2009-0112660; 8 pages.

*Primary Examiner* — Khoi Tran
*Assistant Examiner* — Dale Moyer

(57) ABSTRACT

A navigation method, apparatus, and a computer readable medium for a mobile terminal support a display mode that provides a good field of view and enhanced readability. An input signal for enabling a route guidance function is received. Map data for route guidance is outputted when the route guidance function is enabled. Whether to activate a heads-up display (HUD) mode is determined. When the HUD mode is activated, only preset guidance information items that are extracted from the map data are displayed. Hence, the driver does not have to look away from the road to view the map on the screen, significantly reducing the risk of traffic accidents. Simplified route guidance information is provided to solve poor map readability due to screen size limitations of a mobile terminal.

17 Claims, 4 Drawing Sheets

(56) References Cited

U.S. PATENT DOCUMENTS

2010/0088015 A1* 4/2010 Lee .............................. 701/200
2011/0093190 A1* 4/2011 Yoon ............................ 701/201

FOREIGN PATENT DOCUMENTS

| KR | 2006-0058215 | 5/2006 |
| KR | 2009-0023185 | 3/2009 |

* cited by examiner

NAVIGATION METHOD AND APPARATUS FOR MOBILE TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 20, 2009, and assigned Serial No. 10-2009-0112660, the entire disclosure of which is hereby incorporated by reference.

TECHNICAL FIELD OF THE INVENTION

The present invention relates to a navigation method, apparatus, and a computer readable medium for a mobile terminal and, more particularly, to a navigation method, apparatus, and a computer readable medium for a mobile terminal utilizing a display mode that provides a good field of view and enhanced readability.

BACKGROUND OF THE INVENTION

With rapid advances in technology, mobile terminals are being equipped with increasingly diverse functions in addition to the voice call function. For example, modern mobile terminals may provide supplementary functions related to text messaging, image capture, music listening, digital broadcasting, electronic messaging, instant messaging, and navigation.

In particular, a mobile terminal that includes a navigation function may receive location information from Global Positioning System (GPS) satellites or from a base station, combine the location information with geographic map data, and provide the user with audio and visual information as to a route to a destination.

However, the display unit of a mobile terminal has a small size (low resolution) in consideration of mobility. That is, owing to the small screen size, the user may have difficulty reading the map data provided by the mobile terminal that includes a navigation function. While driving, the mobile terminal that includes a navigation function is normally installed in a cradle attached to the windshield of the car. This may obstruct the driver's field of view. In addition, as the cradle is not placed directly in front of the driver, the driver may have to look away from the road to view the map on the screen. This may significantly increase the risk of traffic accidents.

SUMMARY OF THE INVENTION

To address the above-discussed deficiencies of the prior art, it is a primary object to provide a navigation method and apparatus for a mobile terminal that support a display mode in which route guidance information is output in front of the driver to provide a good field of view and enhanced readability.

In accordance with an embodiment of the present invention, there is provided a navigation method for a mobile terminal supporting a route guidance service. The method includes receiving an input signal for enabling a route guidance function. Map data is outputted for route guidance when an input signal for enabling the route guidance function is received. It is determined whether an input signal for activating a heads-up display (HUD) mode, in which only preset guidance information is output, is generated. And when an input signal for activating the HUD mode is generated, preset guidance information items that are extracted from the map data are outputted.

In accordance with another embodiment of the present invention, there is provided a navigation apparatus for a mobile terminal supporting a route guidance service. The apparatus includes a display unit that outputs map data for route guidance, and when a heads-up display (HUD) mode in which only preset guidance information is output is activated, outputs preset guidance information items that are extracted from the map data. An input unit generates an input signal for activating or deactivating the HUD mode. And a control unit activates the HUD mode when an input signal for activating the HUD mode is generated after a route guidance function is enabled.

In a feature of the present invention, a driver using the navigation method and system does not have to look away from the road to view the map on the screen, significantly reducing the risk of traffic accidents. Simplified route guidance information is provided to improve information readability. Guidance information and the background are output in contrasting colors to further improve information readability. The navigation method and system permit the driver to select guidance information items, providing a route guidance service according to driver preferences.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. Detailed descriptions of well-known functions and structures incorporated herein may be omitted to avoid obscuring the subject matter of the present invention. The description of the various embodiments does not describe every possible instance of the invention. Therefore, it should be understood that various changes may be made and equivalents may be substituted for elements of the invention.

In the description, the HUD (heads-up display) mode refers to a mode in which only preset guidance information items extracted from the map data combined with various information are output.

The mobile terminal of the present invention is a terminal that supports a navigation function and the HUD mode, and may be a mobile communication terminal, personal digital assistant (PDA), smart phone, portable multimedia player (PMP), or navigation device.

Figure 1:
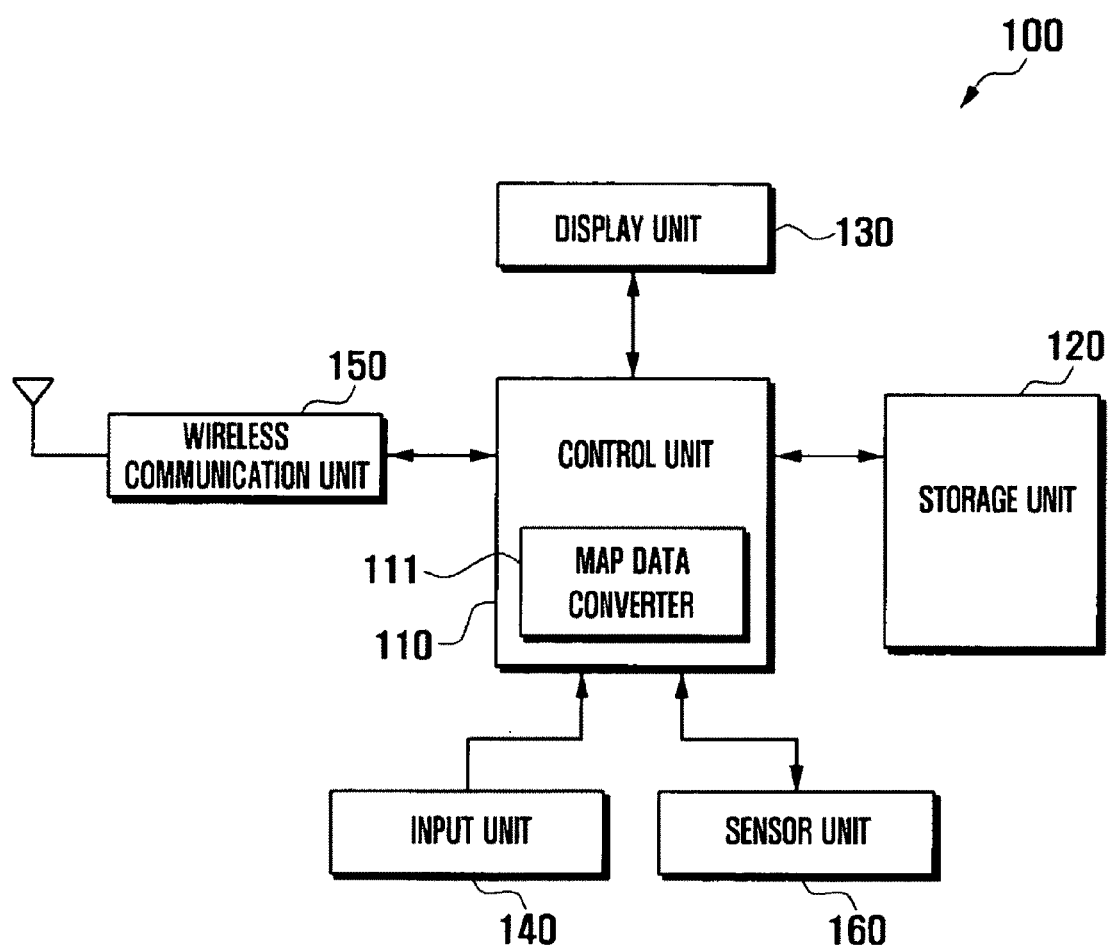
FIG. 1 illustrates a mobile terminal according to an embodiment of the present invention.

FIG. 1 illustrates a mobile terminal 100 according to an embodiment of the present invention.

Referring to FIG. 1, the mobile terminal 100 may include a sensor unit 160, a wireless communication unit 150, an input unit 140, a display unit 130, a storage unit 120, and a control unit 110.

The sensor unit 160 is used to determine whether the mobile terminal 100 is placed in the cradle, and may include one or more sensors to measure the slope of the mobile terminal 100. For example, the sensor unit 160 may include a tilt sensor, a gravity sensor or a motion sensor. Under the control of the control unit 110, the sensor unit 160 is activated when the route guidance function is activated and measures the slope of the mobile terminal 100 and sends the measured slope value to the control unit 110 at regular intervals. When the HUD mode is not automatically activated or deactivated through sensing, the sensor unit 160 need not be included in the mobile terminal 100.

The wireless communication unit 150 sends and receives a radio frequency signal to and from a mobile communication network (or a base station). The wireless communication unit 150 may include a duplexer (not shown) for separating a transmit signal from a receive signal, a radio frequency transmitter (not shown) for up-converting the frequency of a signal to be transmitted and amplifying the signal, and a radio frequency receiver (not shown) for low-noise amplifying a received signal and down-converting the frequency of the received signal. If the mobile terminal 100 is not equipped with a GPS module, the wireless communication unit 150 may receive map data and location information from the base station, under the control of the control unit 110, when the route guidance function is activated.

The input unit 140 includes a plurality of alphanumeric and function keys for entering alphanumeric information, setting various functions and controlling the operation of the mobile terminal 100. For example, the input unit 140 may include a "call" key for making a voice call, a "video call" key for making a video call, an "end" key for terminating a voice or video call, and a "volume" key for adjusting the output volume of an audio signal. In particular, the input unit 140 may include a shortcut key for activating or deactivating the HUD mode. In the HUD mode, only preset guidance information items that are extracted from the map data combined with various information are output. The extracted guidance information items may be projected onto the windshield such that the driver may easily view them. The input unit 140 may include one or more of a touch pad, a touch screen, and a keypad (regular or QWERTY) according to design.

The display unit 130 displays various menus of the mobile terminal 100, information input by the user, function setting information, and information to be provided to the user. For example, the display unit 130 may output a boot screen, an idle screen, a menu screen, and a video call screen. In an embodiment, the display unit 130 may output map data for route guidance. In the HUD mode, under the control of the control unit 110, the display unit 130 may output simplified map data including selected guidance information items (for example, current location, travel speed, turn direction arrow, and distance to next turn). Output of simplified guidance information may solve the problem of poor map readability due to screen size limitations. Under the control of the control unit 110, the display unit 130 may output the guidance information and the background in visually contrasting colors to further improve map readability. The display unit 130 may output guidance information in a reversed (upside-down) form, which is related to image reversal caused by reflection of the windshield. This is described later in connection with FIG. 4. The display unit 130 may be realized using liquid crystal display (LCD) devices, organic light emitting diodes (OLED), or active matrix organic light emitting diodes (AMOLED). If the display unit 130 has a touch screen capability, it may act as an input means. For example, when the route guidance function is activated, the display unit 130 may display an on-screen key for activating and deactivating the HUD mode.

The storage unit 120 may store an operating system of the mobile terminal 100, application programs for optional functions related to, for example, audio reproduction, image or moving image playback and broadcast reception, user data and received data from external entities. In an embodiment, the storage unit 120 may store map data for route guidance. The storage unit 120 may store a conversion program, which extracts preset guidance information items in the HUD mode and outputs the guidance information items and the background in visually contrasting colors (for example, guidance information in yellow and background in black). The conversion program may output guidance information in a reversed (upside down) form, which is related to image reversal caused by reflection of the windshield. This is described later in connection with FIG. 4. The storage unit 120 may store a menu that allows the user to select the guidance information items to be extracted, providing a route guidance service according to user preferences. The storage unit 120 may store a menu to set an automatic HUD on-off option for automatically enabling and disabling the HUD mode according to the sensing result from the sensor unit 160. To achieve this, the storage unit 120 may store a reference value for the sensing result corresponding to placement of the mobile terminal 100 in the cradle. The reference sensing value may be a value range.

The control unit 110 controls the overall operation of the mobile terminal 100, controls signal exchange between the internal blocks thereof, and processes data transmitted and received through the wireless communication unit 150. In particular, the control unit 110 may include a map data converter 111.

The map data converter 111 uses a conversion program stored in the storage unit 120 in the HUD mode to extract preset guidance information items from the map data and to output the guidance information items and the background in visually contrasting colors on the display unit 130. Here, the map data converter 111 may process the guidance information such that it is output in a reversed form on the display unit 130.

The control unit 110 may activate the sensor unit 160 upon execution of the route guidance function and compare a sensing value from the sensor unit 160 with the preset reference sensing value corresponding to placement of the mobile terminal 100 in the cradle. When the sensing value is below or above the reference sensing value, the control unit 110 may activate the HUD mode. That is, the control unit 110 may activate the HUD mode upon determining that the mobile terminal 100 is not placed in the cradle. Later, when the difference between a sensing value from the sensor unit 160 and the reference sensing value is less than or equal to a given tolerance, the control unit 110 may deactivate the HUD mode and output map data on the display unit 130. The control unit 110 may deactivate the sensor unit 160 upon termination of the route guidance function.

The control unit 110 may check the automatic HUD on-off option, which enables the sensor unit 160 to automatically activate or deactivate the HUD mode. That is, when the automatic HUD on-off option is set to 'on' after activation of the route guidance function, the control unit 110 may activate the sensor unit 160. When the automatic HUD on-off option is set to 'off', the control unit 110 may deactivate the sensor unit 160. The control unit 110 may set the automatic HUD on-off option to 'on' or 'off' according to an input signal generated by a preset shortcut key.

Although not shown in FIG. 1, the mobile terminal 100 may further include any of a camera module for capturing images or moving images, a short-range communication module for personal area networking, a digital broadcast receiving module, a digital audio playback module such as an MP3 module, and an Internet access module for connecting to the Internet. Given the trend towards digital convergence, it should be apparent to those skilled in the art that the mobile terminal 100 of the present invention may further include a unit comparable to (other than) the above-described units.

An embodiment of the mobile terminal 100 has now been described. Next, a description is given of a navigation method for the mobile terminal 100.

Figure 2:
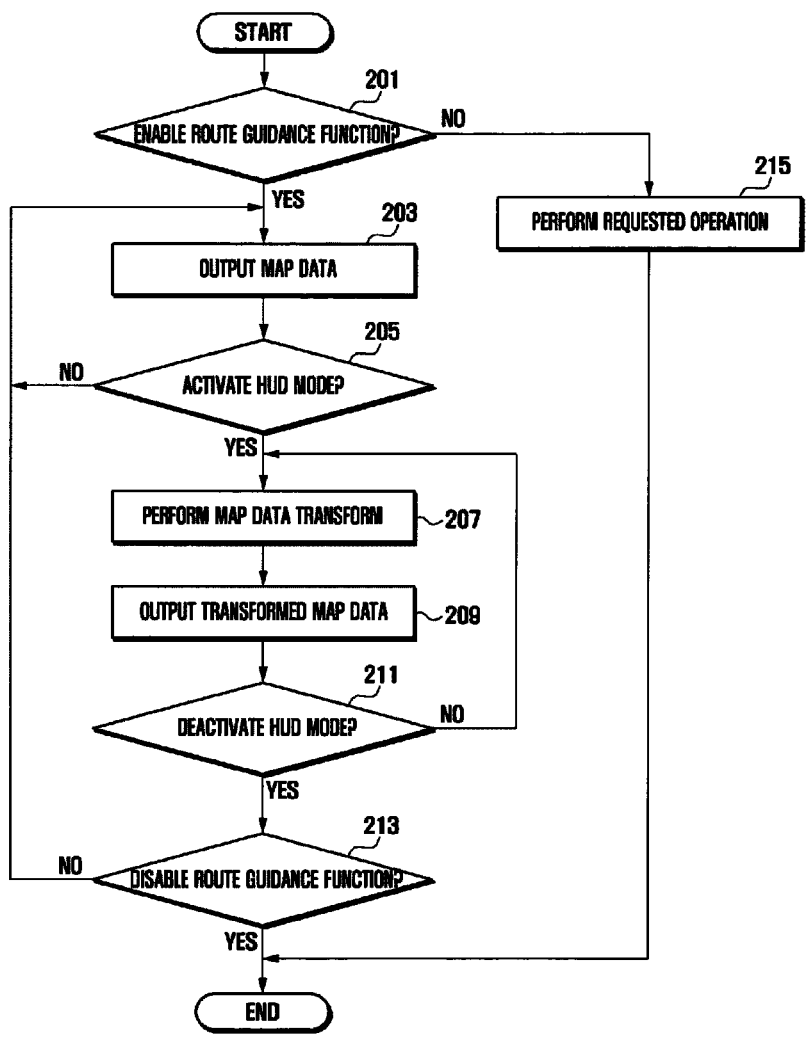
FIG. 2 illustrates a navigation process for the mobile terminal according to an embodiment of the present invention.
Figure 3:
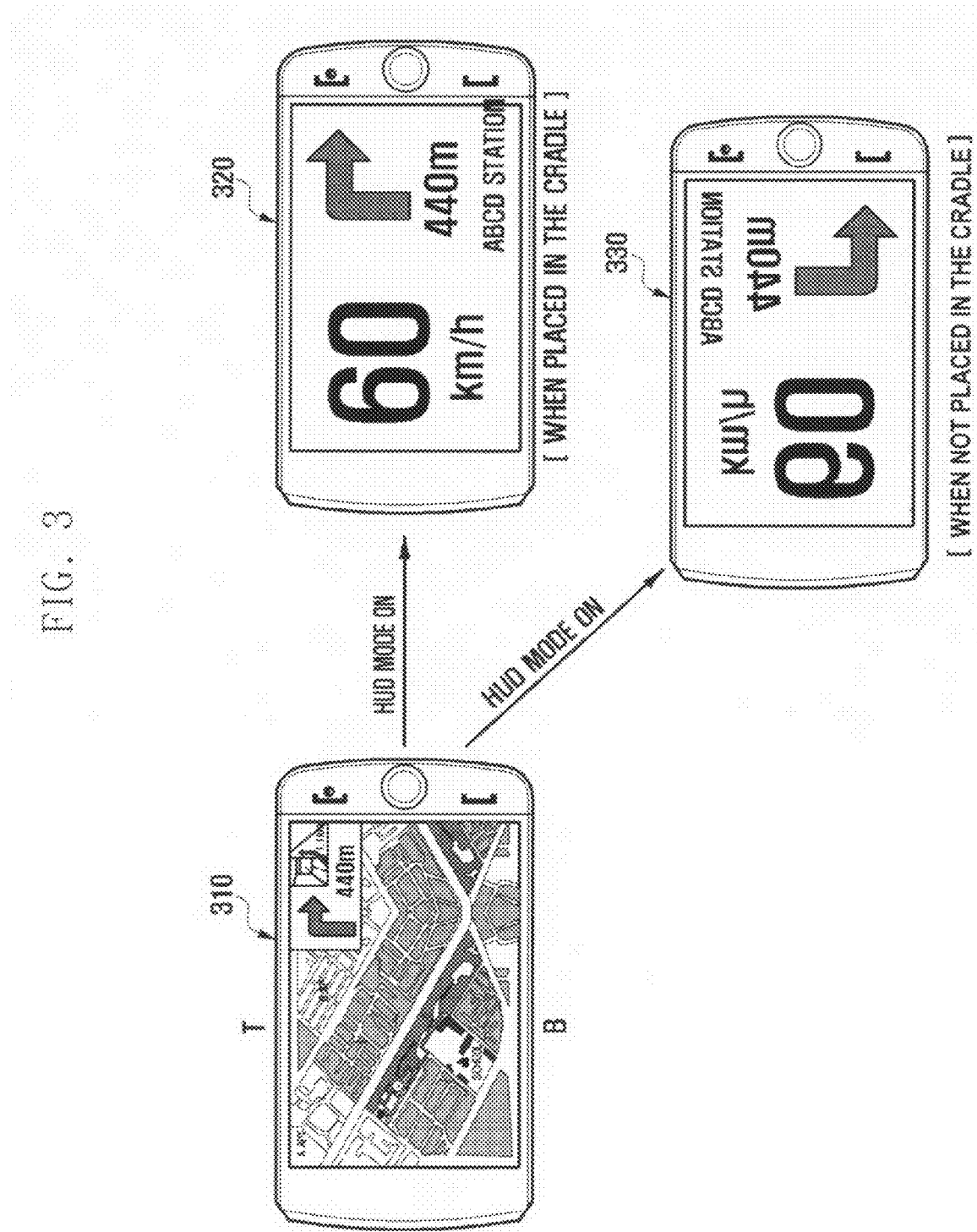
FIG. 3 illustrates output of route guidance information according to the navigation process.
Figure 4:
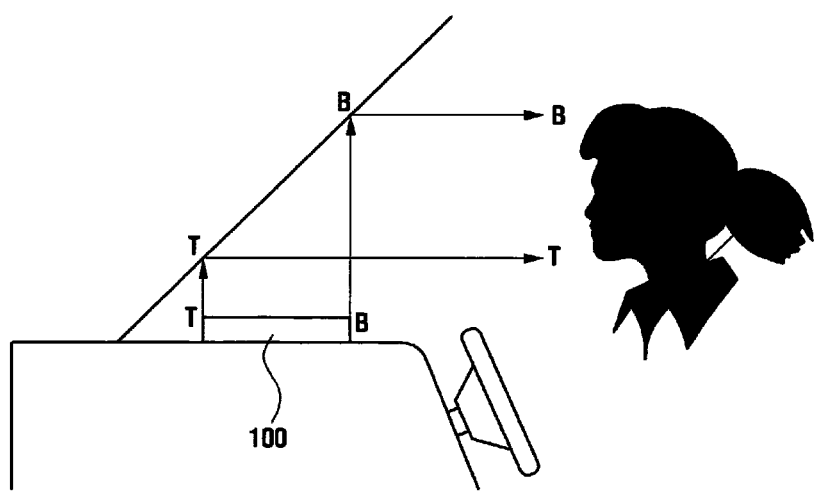
FIG. 4 illustrates use of the HUD mode in the mobile terminal according to an embodiment of the present invention.

FIG. 2 illustrates a navigation process for the mobile terminal 100 according to an embodiment of the present invention. FIG. 3 illustrates output of route guidance information. FIG. 4 illustrates use of the HUD mode in the mobile terminal 100.

Referring to FIG. 2, initially, the mobile terminal 100 is assumed to be in the idle state after booting up.

In block 201, the control unit 110 of the mobile terminal 100 checks whether an input signal is a request for enabling the route guidance function. When the input signal is not a request for enabling the route guidance function, the control unit 110 performs an operation corresponding to the input signal in block 215. For example, the control unit 110 may perform an operation related to audio file playback, a call, or broadcast reception according to a user request.

When the input signal is a request for enabling the route guidance function, the control unit 110 outputs map data for route guidance on the display unit 130 in block 203. Here, the map data may be pre-stored in the storage unit 120 if the mobile terminal 100 is equipped with a GPS module for route guidance, and may be received from a base station if the mobile terminal 100 is not equipped with a GPS module.

In block 205, the control unit 110 checks whether a signal for activating the HUD mode is generated. The HUD mode may be activated when a preset shortcut key is entered or a sensing value from the sensor unit 160 is below or above the reference sensing value stored in the storage unit 120. For example, as shown in FIG. 4, when the user places the mobile terminal 100 on the dashboard under the windshield (not in the cradle) while the route guidance function is enabled, the HUD mode may be activated.

When a signal for activating the HUD mode is not generated, the control unit 110 returns to block 203 and continues to output map data. When a signal for activating the HUD mode is generated, the control unit 110 performs map data conversion to extract preset guidance information items from the map data in block 207. To achieve this, as described before, the control unit 110 may include the map data converter 111, and the storage unit 120 may store a conversion program.

In block 209, the control unit 110 outputs the extracted guidance information items in a color visually contrasting with that of the background on the display unit 130. In connection with FIGS. 3 and 4, when the route guidance function is enabled, the control unit 110, in some embodiments, may control the display unit 130 to output map data for route guidance according to screen 310 of FIG. 3. Here, the map data may include the street map near the current location of the mobile terminal 100 and travel speed and turn direction information. However, map data output according to screen 310 may result in poor readability owing to size limitations of the display unit 130. In the present invention, when the HUD mode is activated, the control unit 110 may extract preset guidance information items from the map data and control the display unit 130 to output the extracted guidance information items in a color visually contrasting with that of the background according to screen 320 of FIG. 3. As a consequence, information readability is enhanced by map data simplification and is further enhanced by use of contrasting colors.

The control unit 110 may control the display unit 130 to output guidance information items in a reversed (upside-down) form according to screen 330 of FIG. 3. This serves to compensate for image reversal caused by reflection from the windshield, as shown in FIG. 4, when the mobile terminal 100 is placed on the dashboard under the windshield such that the top (T) of the mobile terminal 100 faces the windshield and the bottom (B) thereof faces the user or driver.

In the HUD mode, the control unit 110 may control the display unit 130 to output guidance information items in a regular form according to screen 320 when the mobile terminal 100 is determined to be placed in the cradle on the basis of a sensing value from the sensor unit 160, and may control the display unit 130 to output guidance information items in a reversed form according to screen 330 when the mobile terminal 100 is determined not to be placed in the cradle.

Referring back to FIG. 2, the control unit 110 checks whether a signal for deactivating the HUD mode is generated in block 211. The HUD mode may be deactivated when a sensing value from the sensor unit 160 is close to the reference sensing value stored in the storage unit 120 within a given tolerance as a result of placing the mobile terminal 100 in the cradle. The HUD mode may also be deactivated when a preset shortcut key is entered.

When a signal for deactivating the HUD mode is not generated, the control unit 110 returns to block 207. When a signal for deactivating the HUD mode is generated, the control unit 110 deactivates the HUD mode and checks whether a request for disabling the route guidance function is made in block 213. When a request for disabling the route guidance function is made, the control unit 110 disables the route guidance function. When a request for disabling the route guidance function is not made, the control unit 110 returns to block 203 and continues map data output according to screen 310 of FIG. 3.

Although not shown in FIG. 2, the navigation method may further include a process of checking the automatic HUD on-off option. That is, when the automatic HUD on-off option is set to 'on' after the route guidance function is enabled, the control unit 110 may activate the sensor unit 160. When the automatic HUD on-off option is set to 'off', the control unit 110 may deactivate the sensor unit 160. The control unit 110 may set the automatic HUD on-off option to 'on' or 'off' according to an input signal generated by a preset shortcut key.

The navigation method may support a menu that enables the user to select guidance information items to be extracted in the HUD mode, providing a route guidance service according to user preferences.

As apparent from the above description, a driver using the navigation method and apparatus of the present invention does not have to look away from the road to view the map on the screen, significantly reducing the risk of traffic accidents. Refined route guidance information is provided to improve information readability. Guidance information and the background are output in contrasting colors to further improve information readability.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A navigation method for a mobile terminal supporting a route guidance service, comprising:
   outputting, by a display unit, map data for route guidance;
   measuring a slope of the mobile terminal; and
   outputting, by the display unit, in response to a determination to activate a heads-up display (HUD) function based on comparison of the slope of the mobile terminal to a value, preset guidance information in an upside-down reversed form,
   wherein the preset guidance information is extracted from the map data, and
   wherein outputting the preset guidance information comprises converting and outputting a background color to a color contrasted with a color presenting the preset guidance information.

2. The navigation method of claim 1, wherein the determination to activate the HUD function comprises detecting a signal generated by a preset key.

3. The navigation method of claim 1, further comprising outputting a menu screen to permit a user to select guidance information to be extracted from map data.

4. The navigation method of claim 1, wherein the guidance information comprises information regarding at least one of a current location, a travel speed, a turn direction, a distance to next turn, and a traffic lane.

5. The navigation method of claim 1, wherein the background color of the guidance information comprises a black color.

6. A navigation apparatus for a mobile terminal supporting a route guidance service, comprising:
   a display unit configured to output map data for route guidance, and to output, in response to a heads-up display (HUD) function being selected, preset guidance information in an upside-down reversed form, wherein the preset guidance information is extracted from the map data;
   a sensor unit configured to measure a slope of the mobile terminal; and
   a control unit configured to determine to activate the HUD function in response to the input signal for selecting the HUD function being generated and based on comparison of the slope of the mobile terminal to a value; and to convert and cause the display unit to output a background color to a color contrasted with a color presenting the preset guidance information.

7. The navigation apparatus of claim 6, further comprising: a storage unit configured to store the value corresponding to placement of the mobile terminal in a cradle.

8. The navigation apparatus of claim 7, wherein the control unit is configured to activate the HUD function when a sensing value from the sensor unit is below or above the value.

9. The navigation apparatus of claim 8, wherein the value is a threshold range.

10. The navigation apparatus of claim 6, further comprising a storage unit configured to store a menu that permits a user to select guidance information to be extracted from map data in the HUD function.

11. The navigation apparatus of claim 6, wherein the background color of the guidance information comprises a black color.

12. A non-transitory computer readable medium containing software instructions operable when executed for supporting a route guidance function in a mobile terminal, the software instructions when executed perform a method comprising:
   providing map data for route guidance when the route guidance function is enabled; and
   outputting, in response to a determination to activate a heads-up display (HUD) function based on comparison of the slope of the mobile terminal to a value, preset guidance information in an upside-down reversed form,
   wherein the preset guidance information is extracted from the map data, and
   wherein outputting the preset guidance information comprises converting and outputting a background color to a color contrasted with a color presenting the preset guidance information.

13. The non-transitory computer readable medium of claim 12, wherein the determination to activate the HUD function comprises detecting a signal generated by a preset key.

14. The non-transitory computer readable medium of claim 13, wherein the value is a threshold range.

15. The non-transitory computer readable medium of claim 12, further comprising software instructions for providing an interface to permit a user to select guidance information to be extracted from map data.

16. The non-transitory computer readable medium of claim 12, wherein the guidance information comprise information regarding at least one of a current location, a travel speed, a turn direction, a distance to next turn, and a traffic lane.

17. The non-transitory computer readable medium of claim 12, wherein the background color of the guidance information comprises a black color.

* * * * *